(12) United States Patent
Khalilinia et al.

(10) Patent No.: US 11,824,350 B1
(45) Date of Patent: Nov. 21, 2023

(54) CLAMPING CIRCUIT FOR PROTECTING FACTS

(71) Applicant: Smart Wires Inc., Union City, CA (US)

(72) Inventors: Hamed Khalilinia, Hayward, CA (US); Amrit Iyer, St. Petersburg, FL (US); Antonio Ginart, Los Angeles, CA (US)

(73) Assignee: Smart Wires Inc., Durham, NC (US)

( * ) Notice: Subject to any disclaimer, the term of this patent is extended or adjusted under 35 U.S.C. 154(b) by 0 days.

(21) Appl. No.: 17/592,357

(22) Filed: Feb. 3, 2022

Related U.S. Application Data

(60) Provisional application No. 63/260,757, filed on Aug. 31, 2021.

(51) Int. Cl.
*H02H 9/06* (2006.01)
*H02H 9/00* (2006.01)

(52) U.S. Cl.
CPC .............. *H02H 9/06* (2013.01); *H02H 9/005* (2013.01)

(58) Field of Classification Search
CPC .. H02H 3/00; H02H 9/06; H02H 9/04; H02H 9/005; H01C 7/12; H01C 8/04; H01T 4/10
USPC .................................................. 361/117–120
See application file for complete search history.

(56) References Cited

U.S. PATENT DOCUMENTS

| | | |
|---|---|---|
| 3,944,756 A | 3/1976 | Lininger |
| 3,971,639 A | 7/1976 | Matthews |
| 5,226,319 A | 7/1993 | Suzuki |
| 6,327,162 B1 | 12/2001 | Larsen et al. |
| 6,560,087 B1 | 5/2003 | Zennamo, Jr. et al. |
| 6,629,025 B2 | 9/2003 | Evans et al. |
| 6,728,089 B2 | 4/2004 | Harford |
| 8,395,354 B2 | 3/2013 | Sainton |
| 9,331,566 B1 | 5/2016 | Banayan et al. |
| 2003/0086234 A1 | 5/2003 | Harford |
| 2003/0125850 A1 | 7/2003 | Evans et al. |
| 2012/0019213 A1 | 1/2012 | Sainton |
| 2016/0276821 A1* | 9/2016 | Politis ................. H02H 1/0015 |
| 2022/0200245 A1* | 6/2022 | Poterala ................... H02H 9/06 |

* cited by examiner

*Primary Examiner* — Danny Nguyen
(74) *Attorney, Agent, or Firm* — Womble Bond Dickinson (US) LLP (57) ABSTRACT

A clamping circuit employs a filter comprising two series branches of surge arresting circuits to clamp voltage spikes on equipment in series with a power transmission line. Clamping of these voltage spikes protects insulators, semiconductors, and other sensitive components within the series equipment from transient grid events. By using a predetermined frequency to control the response, the filter does not interfere with normal operation of the power system nor the operation of a power flow control module series-coupled to the transmission line through the filter. The clamping circuit employs hysteresis and imposes a shared voltage ratio between the two circuit branches, the ratio depending on frequency and voltage of the transient asserted on the transmission line, in order to provide a very sharp protection response to events within the target frequency range.

20 Claims, 6 Drawing Sheets

FIG.8

CLAMPING CIRCUIT FOR PROTECTING FACTS

CROSS REFERENCE TO RELATED APPLICATIONS

This application claims the benefit of U.S. Provisional Application No. 63/260,757 filed on Aug. 31, 2021, the disclosure of which is incorporated herein by reference.

TECHNICAL FIELD

Embodiments of the disclosure relate to a clamping circuit for attenuating transient grid events, and more particularly for attenuating transient grid events occurring on equipment connected in series with a power transmission line.

BACKGROUND

There is a need in the art for clamping circuits used to protect against voltage spikes or transient grid events occurring on equipment series connected to power transmission lines. For example, protected equipment may include insulators, semiconductors, and other sensitive components.

DETAILED DESCRIPTION

Among other potential causes, transient grid events may include voltage transients on a power transmission line arising from load switching, grid reconfigurations, insertion of power flow control systems, capacitive bank deployment, or power-line faults.

According to some embodiments, a clamping circuit may be connected in parallel with a power flow control module for protecting the power flow control module from transient grid events. The clamping circuit may comprise a first circuit branch including a first surge arresting device in parallel with a first RLC (resistor inductor capacitor) network and a second circuit branch including a second surge arresting device in parallel with a second RLC network. The first circuit branch is connected in series with the second circuit branch. The clamping circuit is operable to clamp a voltage spike greater than the protection threshold of the power flow control module, for example 1 to 4 kV for modular, series-connected, flexible alternating current (AC) transmission systems (FACTS). The clamping circuit is operable to clamp at a predetermined frequency while not interfering with normal operations of the power flow control module at a frequency below the predetermined frequency.

The sharing of voltage between the first circuit branch and the second circuit branch may be varied in accordance with predetermined voltage and frequency combinations of said voltage spike. The first surge arresting device may comprise a plurality of gas discharge tubes (GDTs), including parallel and series combinations. The second surge arresting device may comprise a metal oxide varistor (MOV) or a gapless surge arrestor. The predetermined operating frequency range may be in the range of 40-1000 Hz for example.

In an embodiment, the clamping circuit may be operable to survive high currents at a frequency lower than the predetermined frequency by not clamping events that would exceed the energy ratings of the first or second surge arresting device. The clamping circuit may comprise hysteresis in its I-V characteristic.

In an embodiment, the hysteretic path may comprise currents transitioning between approximately zero amps to a range between 5 kA and 20 kA. The hysteretic path may comprise voltages transitioning between approximately 0-50V and a voltage exceeding 1 kV-10 kV.

The first surge arresting device, the first RLC network, the second surge arresting device and the second RLC network may be mountable on a printed circuit board. The printed circuit board may further include mounted components such as health and event monitoring components.

In an embodiment, the power flow control module may be configurable to deliver at least 20 MVAR (megavolt amps reactive) to a power transmission line.

The clamping circuit may comprise replaceable components having an operational lifetime of at least ten years for a predicted number of worst-case lightning or surge events under normal operating conditions.

According to some embodiments, a method for protecting sensitive electronics in a power flow control device connected to a power transmission line may include: providing a clamping circuit in parallel with the power flow control device; configuring the clamping circuit with a first circuit branch and a second circuit branch connected in series; for a frequency greater than a predetermined frequency, sharing the voltage between the first circuit branch and the second circuit branch with a first ratio; and, for a frequency less that the predetermined frequency, sharing the voltage between the first circuit branch and the second circuit branch with a second ratio.

The first ratio may be greater than 9:1 and the second ratio may be approximately 2:1.

A power flow control module may comprise one or more impedance injection modules configured to inject impedance into a power transmission line and may include a clamping circuit applied across the terminals of the power flow control module for clamping voltage spikes. The clamping circuit includes a first circuit branch in series with a second circuit branch wherein the first circuit branch comprises a first type of surge arrestor and the second circuit branch comprises a second type of surge arrestor. During a voltage spike a voltage sharing ratio between the first and second circuit branches may be predetermined according to voltage and frequency combinations of a voltage spike. The first type of surge arrestor may comprise a gas discharge tube and the second type of surge arrestor may comprise a metal oxide varistor or gapless surge arrester.

Figure 1:
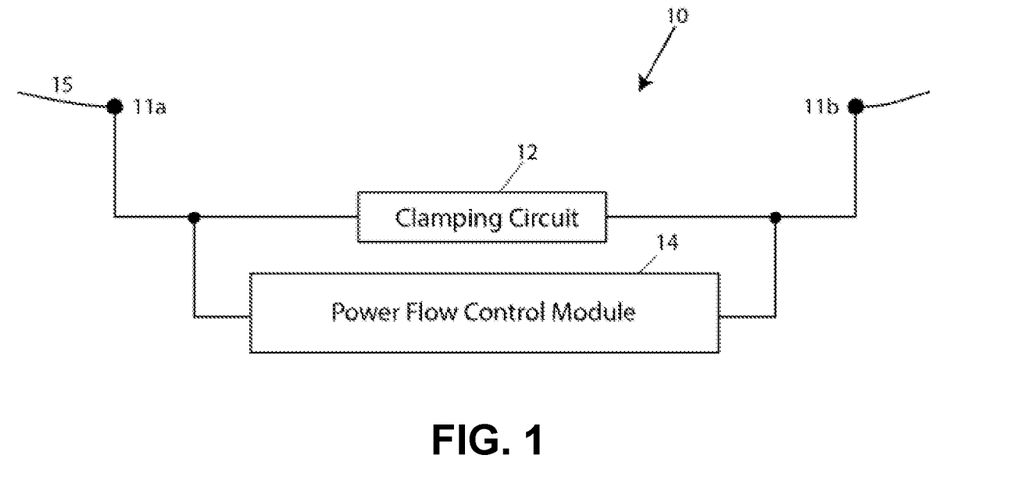
FIG. 1 illustrates a clamping circuit in parallel with a power flow control module connected in series with a power transmission line according to an embodiment.

FIG. 1 illustrates a modular series-connected FACTS device configuration 10 applied across terminals 11a, 11b of a power transmission line 15. FACTS device configuration 10 includes a clamping circuit 12 in parallel with a power flow control module 14. In one embodiment, the power flow module 14 includes a FACTS device. In one embodiment, the FACTS device includes one or more impedance injection modules 22 (see FIG. 2). In one embodiment, an impedance injection module has high-power switches arranged in a full-bridge configuration for charging and discharging a DC capacitor. Impedance injection may occur by injecting energy of the DC capacitor into a power transmission line; this may occur at multiple intervals within each cycle of AC power in the transmission line. In various embodiments, multiple impedance injection modules in a FACTS device could be parallel connected, series connected, or have a combination of parallel and series connection. In various embodiments, the clamping circuit 12 could be provided externally, as in FIG. 1, to various embodiments of FACTS devices, or could be integrated with one or more impedance injection modules or units as illustrated in FIG. 2.

Figure 2:
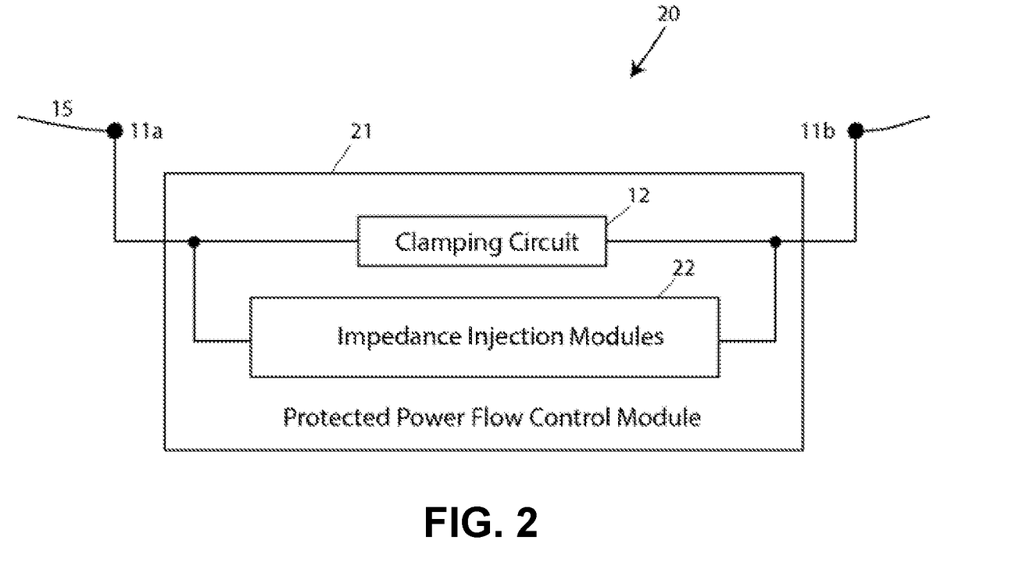
FIG. 2 illustrates a protected power flow control module wherein a clamping circuit is connected in parallel with impedance injection units according to an embodiment.

FIG. 2 illustrates an alternative modular series-connected FACTS device configuration 20 applied across terminals 11a, 11b of power transmission line 15. FACTS device configuration 20 includes a protected power flow control module 21 comprising clamping circuit 12 in parallel with a FACTS device that includes one or more series connected impedance injection modules 22.

Figure 3:
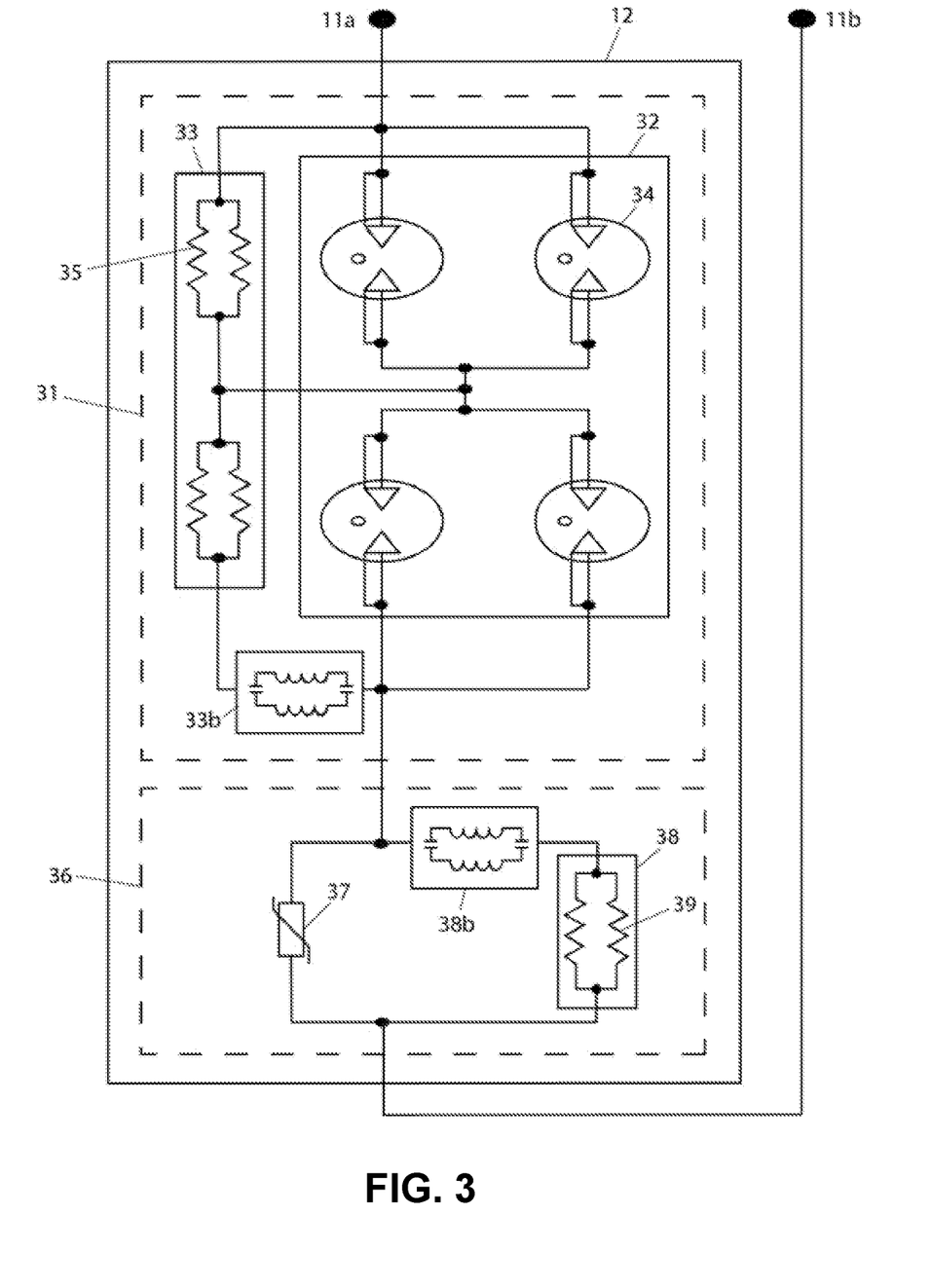
FIG. 3 illustrates a clamping circuit including a first circuit branch in series with a second circuit branch according to an embodiment.
Figure 6:
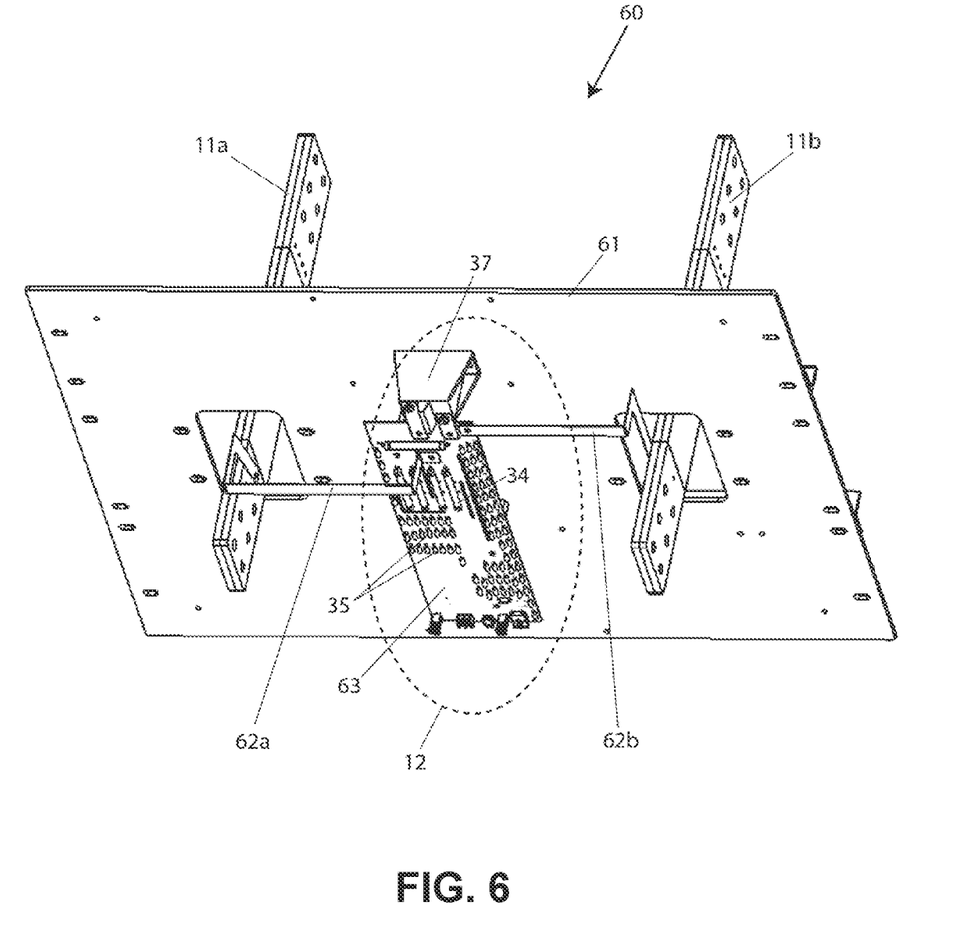
FIG. 6 illustrates a clamping circuit mounted on a printed circuit board mounting plate and connected in series with a power transmission line according to an embodiment.

FIG. 3 illustrates clamping circuit 12 connected across terminals 11a and 11b of a power transmission line 15. Clamping circuit 12 includes a first circuit branch 31 comprising a first surge arresting device 32 in parallel with a first RLC network 33. First surge arresting device 32 may include gas discharge tubes 34 in a series/parallel configuration as shown. In an embodiment, a gas discharge tube is an EPCOS B88069X4300C251 having, as examples, a DC spark over voltage rating of 1400V+/−20%, a nominal impulse discharge current of 20-30 kA, an impulse spark over voltage<1900V at 100 V/μS for 99% of measured values and an impulse spark over voltage<2200V at 1 KV/μS for 99% of measured values. First RLC network 33 may comprise resistors 35 in a series/parallel combination as shown. In an embodiment, the L and C components of first RLC network 33 are parasitic components of inductance and capacitance arising from the interconnections between the resistors in parallel/series combinations and the gas discharge tubes 34 in parallel/series combinations, and the connection 11a to a power transmission line, depicted as 33b in FIG. 3. In an embodiment, resistor 35 is a high-voltage, flame proof, high wattage resistor such as ROX3001M00FKEM, available from VISHAY. This resistor 39 has a value of 1 megohm±1% and a power rating of 10 watts, and further values and power ratings are contemplated. To adjust resistance values and an overall power rating it is convenient to provide series/parallel combinations of this commercially available component as shown in FIG. 3, for various embodiments. Clamping circuit 12 may include a second circuit branch 36 comprising a second surge arresting device 37 in parallel with a second RLC network 38. In an embodiment, second surge arresting device 37 is a metal oxide varistor (MOV) such as a V282BB60 available from LITTELFUSE, INC., having a maximum clamping voltage of 7400V at 200 A. Second RLC network 38 may comprise resistors 39 in a parallel combination as shown. In an embodiment, the L and C components of second RLC network 38 are parasitic components of inductance and capacitance arising from the interconnections between the parallel resistor combination 39, the second surge arresting device 37, the first RLC network 33, and connection 11b to the power transmission line, depicted as 38b in FIG. 3. Like resistor 35, in an embodiment, each resistor 39 is a high-voltage, flame proof, high wattage resistor such as ROX3001M00FKEM available from VISHAY. First and second RLC networks 33 and 38 are tuned to balance the voltage sharing ratio between the MOV and the GDT components at low frequencies, for example less than 1000 Hz. In one embodiment, for 60 Hz occurrences, the MOV will handle one third of the voltage and the GDTs will handle two thirds of the voltage. In an embodiment, for high frequency occurrences, the innate parasitic capacitance of the MOV will short out resistor network 38, and passive operation of the MOV and GDTs will absorb transient current events. The high wattage resistors of FIG. 3 such as 35, 39 may be mounted on a printed circuit board 63 as depicted in FIG. 6. Inductance L, and capacitance C of RLC networks 33 and 38 may be provided in additional discrete components (not shown) or may be parasitic values arising from their mounted geometries and components, or various combinations thereof.

RLC networks 33 and 38 are tuned in order to balance the voltage sharing ration between the MOV and GDT components at low frequencies (e.g., less than 1000 Hz). In one embodiment, it is desired and the circuit is tuned so that the MOV (e.g., surge arresting device 37) handles ⅓ of the voltage and the 2× GDTs (e.g., gas discharge tubes 34) handle ⅔ of the voltage for 60 Hz occurrences. At high frequencies, it is expected the circuit applies the innate parasitic capacitance of the MOV (e.g., surge arresting device 37) to short out the RLC network 38 including resistor(s) 39, and for the previous relationship not to hold, and for the MOV and GDTs to be more prone (via a passive mechanism) to absorb transient current events.

Figure 4:
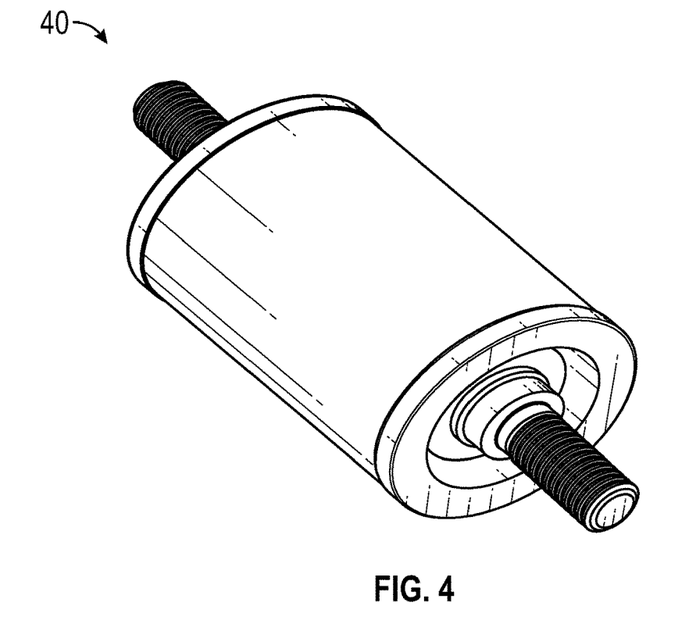
FIG. 4 illustrates an example gas discharge tube that may be used as a component according to an embodiment.

FIG. 4 depicts an example EPCOS gas discharge tube according to an embodiment. In FIG. 4, the EPCOS gas discharge tube 40 may be any of gas discharge tubes 34 of FIG. 3.

Figure 5:
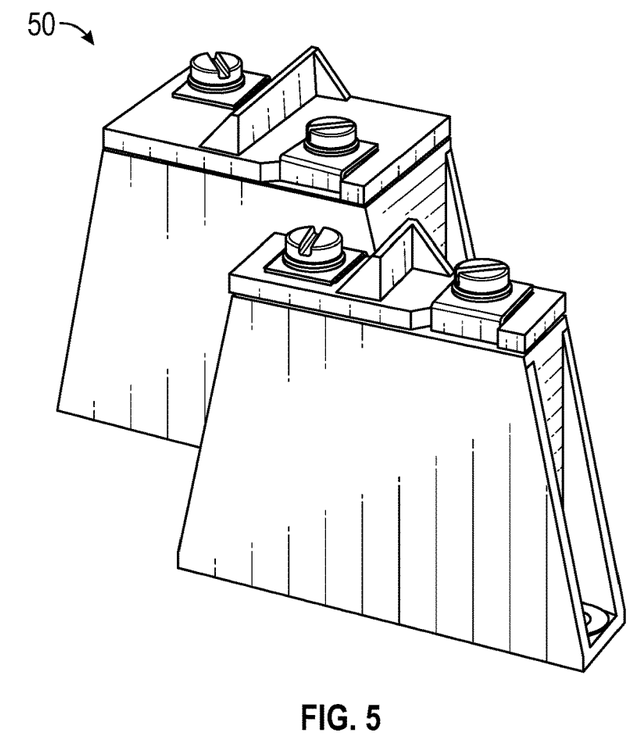
FIG. 5 illustrates a pair of example gapless surge arresters in the form of metal oxide varistors that may be used as components according to an embodiment.

FIG. 5 depicts example MOV devices according to an embodiment. In FIG. 5, one or more MOV devices 50 may be included in or represent second surge arresting device 37 of FIG. 3.

FIG. 6 illustrates mounting of clamping circuit 12 on printed circuit boards (PCBs) 61, 63. Second surge arresting device 37 is shown mounted on PCB 61. Gas discharge tube 34 and high-power resistors 35 are shown mounted on PCB 63. Primary busbars connect at 11a, 11b to a power transmission line. Secondary busbars 62a and 62b connect to the primary busbars as shown.

Figure 7:
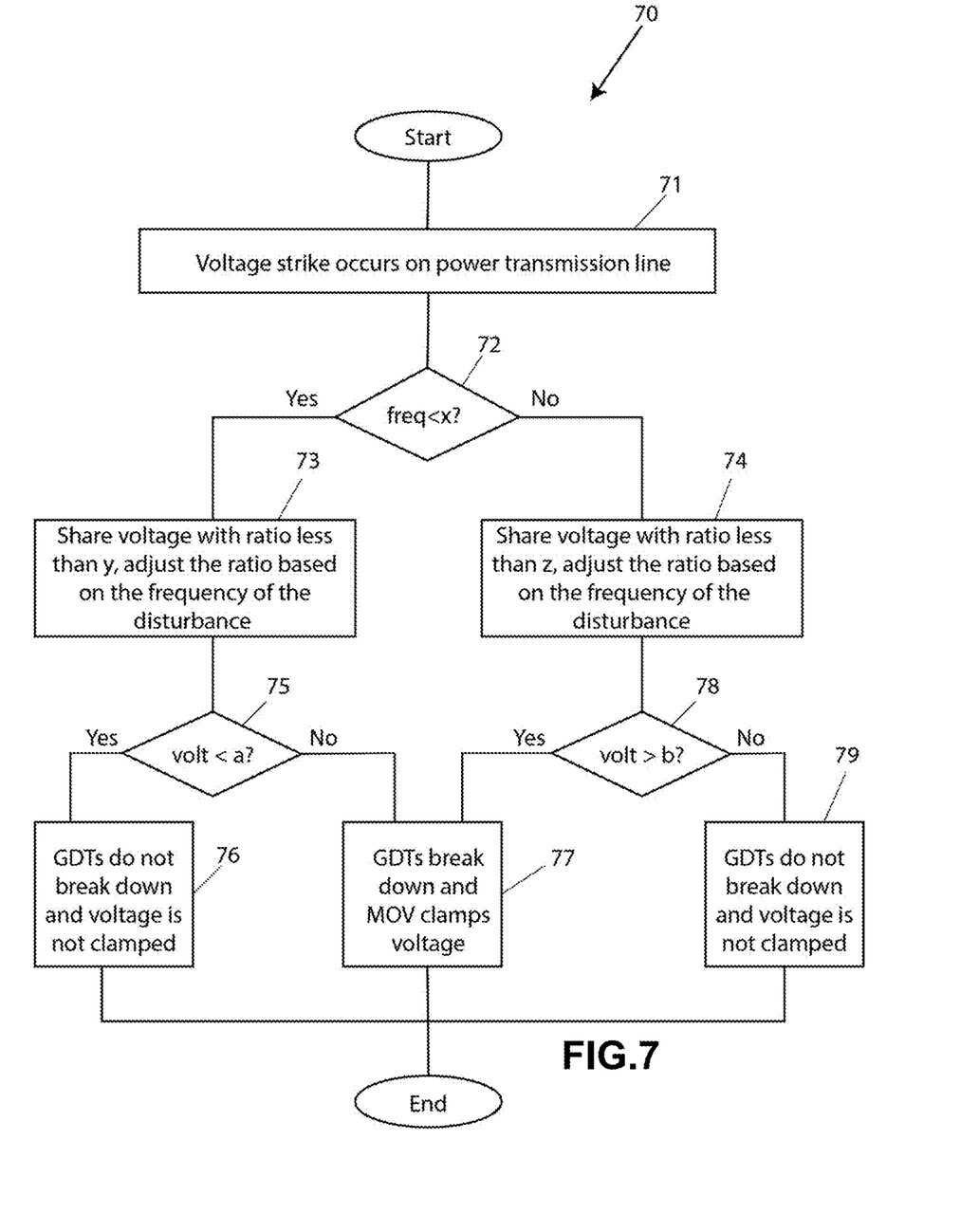
FIG. 7 is a flow chart of a method for protecting sensitive electronics in a power flow control device connected to a power transmission line according to an embodiment.

FIG. 7 is a flow diagram illustrating a method for protecting a power transmission line from voltage spikes according to an embodiment. The clamping circuit comprises passive circuits that operate instantaneously, without any processing delay (as would be the case with processor(s), e.g., digital signal processing). The circuit can be tuned to clamp at a predetermined frequency while not interfering with normal operations of the power flow control module at a frequency below the predetermined frequency, such as the line frequency of a power transmission line. This is recommended because a normal operating line current in a power transmission line may exceed the surge capacity of a clamping circuit.

The method protects semiconductors in equipment connected in parallel with the clamping circuit. By judicious selection of components, clamping circuit 12 will act like a filter or a combination of filters that discriminates between different frequencies present in a line fault condition. Furthermore, the clamping circuit will withstand anticipated power surges, by routing the energy appropriately within the circuit during the progression of a fault. Gas discharge tubes such as gas discharge tubes 34 provided in a first branch of the clamping circuit 12 form an arc within nanoseconds, initiated when the applied voltage exceeds the spark-over voltage. The resistance of the gas discharge tube switches between a few ohms when arcing to a few hundred megohms when not arcing. Accordingly, an initial voltage spike will be dissipated in a second branch of the clamping circuit 12 that includes one or more metal oxide varistors (MOVs), e.g., as surge arresting device 37. After a period of approximately 100 microseconds, the surge current has dropped, the arcs in the gas discharge tubes extinguish, and any remaining fault energy is dissipated in the high-power resistor networks such as RLC networks 33 and 38.

Referring to method 70 in FIG. 7, at block 71, a voltage strike may occur on a power transmission line. At block 72, in response to the voltage strike occurring on the power transmission line, filter action determines if a detected frequency of the voltage spike is less than x (typically 10 kHz). If Yes, indicating a power line operating frequency, at block 73 the voltage spike may be shared with ratio y (typically 2:1), or less than y, adjusted based on the frequency of the disturbance, between the first circuit branch and the second circuit branch. If No, indicating a fault frequency, at block 74 the voltage spike may be shared with ratio z (typically 9:1) or greater than z, adjusted based on the frequency of the disturbance between the first circuit branch and the second circuit branch. At block 75, it is determined if the peak of the voltage spike is less than a (typically 8 kV). If Yes, indicating the voltage spike is less than the threshold value "a", at block 76 the first circuit branch does not break down and the voltage is not clamped. If No, indicating the voltage spike is not less than the threshold value "a", i.e. the voltage spike is greater, at block 77 the first circuit branch breaks down and the second circuit branch clamps the voltage. At block 78, it is determined if the peak voltage is greater than b (typically 6 kV). If Yes, indicating the peak voltage is greater than the threshold value "b", again at block 77 the first circuit branch breaks down and the second circuit branch clamps the voltage. If No, indicating the peak voltage is not greater than the threshold value "b", i.e., the peak voltage is lower, at block 79 the output voltage is not clamped. As examples, values for x, y, z, a, b may be 10 kHz, 2:1, 9:1, 8 kV, and 6 kV respectively.

The filter action of block 72 works as follows. In each RLC network, the resistor, inductor, and capacitor each have a different impedance at a specific frequency, i.e. freq. x. The voltage drop across RLC 33 can be tuned to be different from branch 38. The voltage sharing ratio will mirror the frequency response of RLC network 33 vs RLC network 38, at which point the GDT and MOV will innately respond to the voltages created per the physics of those devices. In block 75, the GDTs and the MOV will determine if the voltage is less than a.

Circuit action that implements the above-described method in various embodiments is as follows. How do the RLC circuits apply the test to determine if the detected frequency is less than x? The resistor, inductor, and capacitor each have a different impedance at a specific frequency, e.g., freq x and frequencies above and below this frequency threshold. The voltage drop in one branch, across RLC network 33 can be tuned to be different than another branch, RLC network 38. The voltage sharing ratio will mirror the frequency response of RLC network 33 vs RLC network 38, at which point the GDT (e.g., gas discharge tube(s) 34) and MOV (e.g., surge arresting device 37) will innately respond to the voltages created per the physical characteristics of those particular devices.

How do the RLC circuits enforce the shared ratio y at a frequency less than x? The shared ratio will be y or less than y, but it will adjust based on the frequency of the disturbance.

How does the circuit function so the RLC circuits enforce the shared ratio z at frequency not less than x? The shared ratio will be greater than z, but it will adjust based on the frequency of the disturbance.

How does the circuit function to determine if the peak of the voltage spike is less than a? This determination is made by the GDTs and MOV, not the RLC.

How does the circuit function so the first circuit branch does not break down and the voltage is not clamped if the voltage spike is less than a? This action is performed by the GDT and MOV. For the GDT and MOV the properties of the materials within those components will change and drastically lose impedance past a certain value, i.e. a.

What does "break down" mean in terms of circuit action? For the GDT and MOV the properties of the materials within those components will change and drastically lose impedance past a certain value, i.e. a.

How does the circuit function so the first circuit branch breaks down and the second circuit branch clamps the voltage if the voltage is greater than b? This determination is made by the GDTs and MOV, not the RLC. The GDT is chosen such that it breaks down at voltages greater than b for disturbances at frequencies larger than x.

How do the circuits make it so the output voltage is not clamped if the peak voltage is not greater than b? This determination is made by the GDTs and MOV, not the RLC. The GDT is chosen such that it does not break down at voltages less than b for disturbances at frequencies larger than x.

What is the significance of the example values for x y z a b for one embodiment? These values are based on a set of representative FACTS devices between 1 and 10 MVAr of power output and made for 230-500 kV transmission lines.

Figure 8:
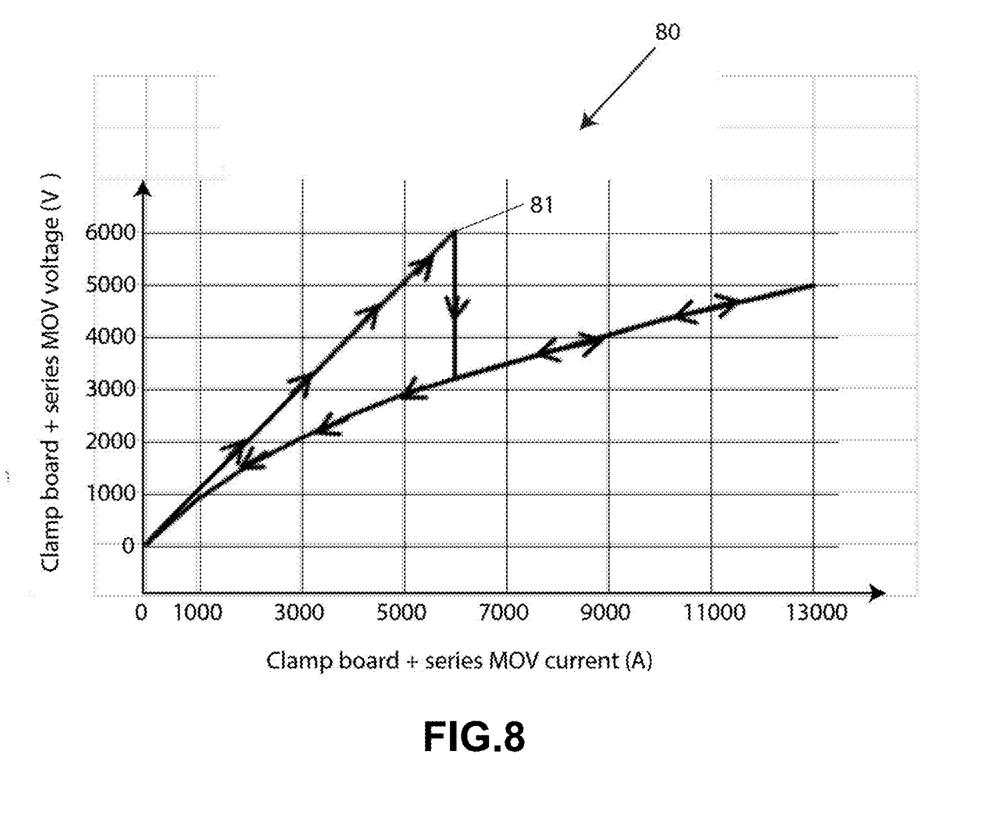
FIG. 8 illustrates an example hysteresis curve for the IN characteristic of a clamping circuit according to an embodiment.

FIG. 8 is a graph showing an example hysteresis curve 80 for the I-V characteristic of a clamping circuit (e.g., clamping circuit 12 of FIG. 1) according to an embodiment. For a representative device under test, with an impedance of approximately 1 ohm at frequency x, and a GDT-to-MOV voltage sharing of z at frequency x: if a surge current at frequency x of 13 kA occurs, the voltage of the device rises linearly with current until point 81 is reached, at which point the GDTs break down and overall device impedance is reduced by current diverting through the MOV, and the device under test (DUT) follows the MOV's I-V curve until the current drops to zero and the GDT's ionization dissipates. At this point the device is back on its original linear I-V curve for events at frequency x.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different structural construct, names, and divisions. Accordingly, the disclosure of the invention is intended to be illustrative, but not limiting, of the scope of the invention.

While the invention has been described in terms of several embodiments, those of ordinary skill in the art will recognize that the invention is not limited to the embodiments described but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A clamping circuit, comprising:
    a first circuit branch comprising a first surge arresting device in parallel with a first RLC (resistor inductor capacitor) network;
    a second circuit branch comprising a second surge arresting device in parallel with a second RLC network;
    the first circuit branch and the second circuit branch connected in series, the series-connected first circuit branch and second circuit branch connectable across a power flow control module comprising at least one FACTS (flexible alternating current transmission system);
    the clamping circuit operable to clamp a voltage spike greater than a protection threshold of the power flow module; and
    the clamping circuit operable to clamp respective to a predetermined frequency.

2. The clamping circuit of claim 1, wherein sharing of voltage between the first circuit branch and the second circuit branch is to be varied in accordance with predetermined voltage and frequency conditions of the voltage spike.

3. The clamping circuit of claim 1, wherein the first surge arresting device comprises a plurality of gas discharge tubes.

4. The clamping circuit of claim 1, wherein the first surge arresting device comprises a parallel and series combination of gas discharge tubes.

5. The clamping circuit of claim 1, wherein the second surge arresting device comprises a metal oxide varistor or a gapless surge arrester.

6. The clamping circuit of claim 1, wherein the predetermined operating frequency is in a range of 40 to 1000 Hz (cycles per second).

7. The clamping circuit of claim 1, further comprising:
    the first RLC network and the second RLC network tuned to bypass the first surge arresting device and the second surge arresting device so that the clamping circuit is operable to survive high current events at a frequency lower than the predetermined frequency by not clamping voltage spike events that would exceed energy ratings of the first surge arresting device and the second surge arresting device.

8. The clamping circuit of claim 1, further comprising:
    the first RLC network and the second RLC network tuned so that the clamping circuit has hysteresis in an I-V (current-voltage) characteristic for events at a frequency above the predetermined frequency.

9. The clamping circuit of claim 1, further comprising:
    the first RLC network and the second RLC network tuned so that the clamping circuit has a hysteretic path comprising a current transitioning between approximately zero to 10 A (amps) and 5 to 20 kA (kiloamps) for events at a frequency above the predetermined frequency.

10. The clamping circuit of claim 1, further comprising:
    the first RLC network and the second RLC network tuned so that the clamping circuit has a hysteretic path comprising voltage transitioning between approximately 0 to 50 V (volts) and 1 to 16 kV (kilovolts), for events at a frequency above the predetermined frequency.

11. The clamping circuit of claim 1, further comprising:
    a printed circuit board, having the first surge arresting device, the first RLC network, the second surge arresting device and the second RLC network mounted thereupon.

12. The clamping circuit of claim 11, further comprising:
    health and event monitoring components mounted on a printed circuit board having the first surge arresting device, the first RLC network, the second surge arresting device, and the second RLC network.

13. The clamping circuit of claim 1, further comprising:
    the power flow control module having capability to deliver at least 20 MVAR (megavolt amps reactive) to a power transmission line.

14. The clamping circuit of claim 1 comprising replaceable components having an operational lifetime of at least ten years for a specified number of lightning or surge events.

15. A method for protecting electronics in a power flow control device connected to a power transmission line, the method comprising:
    for a frequency greater than a predetermined frequency, sharing voltage of a voltage spike of the power transmission line between a first circuit branch to clamp using a first surge arresting device in parallel with a first RLC (resistor inductor capacitor) network, and a second circuit branch further to clamp using a second surge arresting device in parallel with a second RLC network, with the first circuit branch and the second circuit branch connected in series and the sharing of the voltage spike according to a first ratio; and
    for a frequency less that the predetermined frequency, sharing voltage of a further voltage spike of the power transmission line between the first circuit branch and the second circuit branch, the sharing of the further voltage spike according to a second ratio.

16. The method of claim 15, wherein the first circuit branch comprises a plurality of gas discharge tubes and the second circuit branch comprises a metal oxide varistor or gapless surge arrestor.

17. The method of claim 15 wherein the first ratio is greater than 9:1.

18. The method of claim 15 wherein the second ratio is approximately 2:1.

19. A power flow control module comprising:
    one or more impedance injection modules configured to inject impedance into a power transmission line;
    a clamping circuit across the power flow control module, for clamping voltage spikes;

the clamping circuit comprising a first circuit branch in series with a second circuit branch;

the first circuit branch comprising a first type of surge arrestor;

the second circuit branch comprising a differing, second type of surge arrestor; and a voltage sharing ratio between the first and second circuit branches is predetermined according to voltage and frequency characteristics of the voltage spikes.

20. The power flow control module of claim 19 wherein:

the first type of surge arrestor comprises a gas discharge tube; and the second type of surge arrestor comprises a metal oxide varistor or a gapless surge arrester.

\* \* \* \* \*